(12) United States Patent
Raineri

(10) Patent No.: US 6,631,598 B2
(45) Date of Patent: Oct. 14, 2003

(54) METHOD FOR LAYING FLOORS AND/OR LININGS WITH TILES, PARQUETS, MOQUETTES, WALL-PAPERS, COVERING PANELS AND LIKES AND FOR THEIR SUBSEQUENT QUICK REMOVAL IN THE CASE OF REPLACEMENT THEREOF, BY MEANS OF A DOUBLE ZIG-ZAG SHEATH OF A FLEXIBLE MATERIAL AND MEANS FOR CARRYING OUT SUCH METHOD

(76) Inventor: Gabriele Raineri, Via G. Bonaventura, 3—95036 Randazzo (IT)

( * ) Notice: Subject to any disclaimer, the term of this patent is extended or adjusted under 35 U.S.C. 154(b) by 140 days.

(21) Appl. No.: 09/809,041

(22) Filed: Mar. 16, 2001

(65) Prior Publication Data

US 2002/0124501 A1 Sep. 12, 2002

(51) Int. Cl.⁷ .................................................. E04F 13/08
(52) U.S. Cl. .................. 52/385; 52/386; 52/506.06; 52/DIG. 13; 52/574; 52/125.2
(58) Field of Search ............................. 52/125.2, 385, 52/386, 506.05, DIG. 13, 177, 574, 511

(56) References Cited

U.S. PATENT DOCUMENTS

| | | | | |
|---|---|---|---|---|
| 567,985 A | * | 9/1896 | Clair | 52/177 |
| 570,733 A | * | 11/1896 | Petit | 52/177 |
| 2,884,780 A | * | 5/1959 | Ramirez | 52/511 |
| 4,226,064 A | * | 10/1980 | Kraayenhof | 52/180 |
| 5,691,026 A | * | 11/1997 | Zinke et al. | 428/100 |
| 5,761,867 A | * | 6/1998 | Carling | 52/386 |
| 5,881,508 A | * | 3/1999 | Irvine et al. | 52/177 |
| 6,286,272 B1 | * | 9/2001 | Sandoz | 52/177 |
| 6,298,624 B1 | * | 10/2001 | Pacione | 52/511 |
| 6,305,135 B1 | * | 10/2001 | Inaba | 52/309.12 |
| 6,343,451 B1 | * | 2/2002 | Chih et al. | 52/390 |

FOREIGN PATENT DOCUMENTS

| | | |
|---|---|---|
| EP | 0969162 | 1/2000 |
| WO | 9634164 | 10/1996 |

* cited by examiner

*Primary Examiner*—Lanna Mai
*Assistant Examiner*—Dennis L. Dorsey
(74) *Attorney, Agent, or Firm*—Stevens, Davis, Miller & Mosher, LLP

(57) ABSTRACT

A method and apparatus for laying down floors or linings and for their quick removal and replacement by glueing or fixing them onto a support, removable with respect to a support sheeting (9). The method includes providing fixed support (8) and movable support (7), which have a substantially similar shape. The fixed support (8) being immovably fixed into the support sheeting (9) and the second movable support (7) being movably fitted with the first fixed support (8) and being intended for laying down floors or linings (5).

11 Claims, 4 Drawing Sheets

METHOD FOR LAYING FLOORS AND/OR LININGS WITH TILES, PARQUETS, MOQUETTES, WALL-PAPERS, COVERING PANELS AND LIKES AND FOR THEIR SUBSEQUENT QUICK REMOVAL IN THE CASE OF REPLACEMENT THEREOF, BY MEANS OF A DOUBLE ZIG-ZAG SHEATH OF A FLEXIBLE MATERIAL AND MEANS FOR CARRYING OUT SUCH METHOD

The present invention relates to a building sector and more particularly to an improved method for laying floors and/or linings of any kind, so as to allow their subsequent quick removal for the replacement thereof and laying down a new one, without the necessity of a restoration of the underlaying sheeting.

Usually, for replacing the floors and tile, majolica and like linings, but also moquettes, parquets or wall-papers there are necessary destructive interventions for their removal and sometime for removing the support sheeting, by means of tools and/or electric or pneumatic percussion machineries, with obvious disagreeable consequences, such as noises and formation of dusts and wastes, as well as costs and times of demolition.

From the Italian Patent Application No. RM98A000450 filed on Jul. 3, 1998 in the name of the present inventor a laying down method is known, which allows a quick removal of the floor or of the lining from the underlaying sheeting and a subsequent laying of a new floor or lining. To this end, it is foreseen the use of a fixed and a movable support elements, which in operation are removably engaged with one another: the first one being secured to the sheeting, whereas on the second one the floor or lining is glued so that if necessary it may be detached from the fixed support element by acting on corresponding handles arranged along the perimetric rim of the movable support element.

For attaining the desired results, said known method has the drawbacks consisting in requiring the use of a fixed and a movable support having contact surfaces, which are engaged with one another and different therebetween and are realized for this aim.

A first object of the invention is that to avoid such drawbacks by using as a fixed and as a movable support two elements having the same shape: one rigidly fixed to the sheeting and the other one removably engaged with the first one, on which the floor or lining will be glued.

A second object of the invention is that to provide engagement means which are removable from one another and capable of forming perspiration duets for the underlaying sheeting and/or glue.

A third object of the invention is that to provide fixing means capable of reducing the tearing resistance when it is necessary to remove the floor or the lining from the underlaying support sheeting.

A fourth object of the invention is that to provide fixing means which may be easily upwardly and downwardly folded, along the edges of the floor or lining.

Said objects have been attained by employing as fixed and movable supports, two Greek key or fret shaped sheaths having the same shape.

The invention will be better understood from the following detailed disclosure thereof with reference to the enclosed drawings, which show a non limitative example of an embodiment and some modifications thereof.

Figure 1:
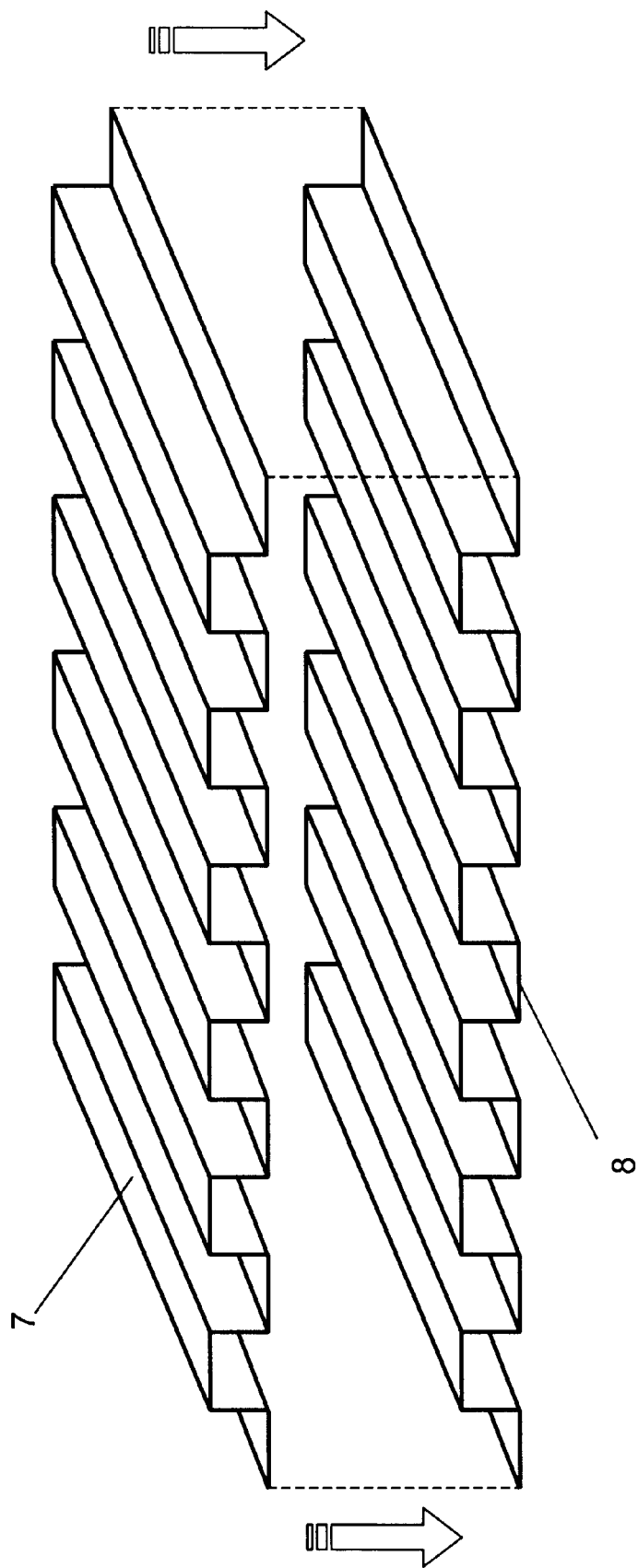
FIG. 1 shows diagrammatically a prospective view of the sheaths to be placed one upon another and engaged with one another.
Figure 2:
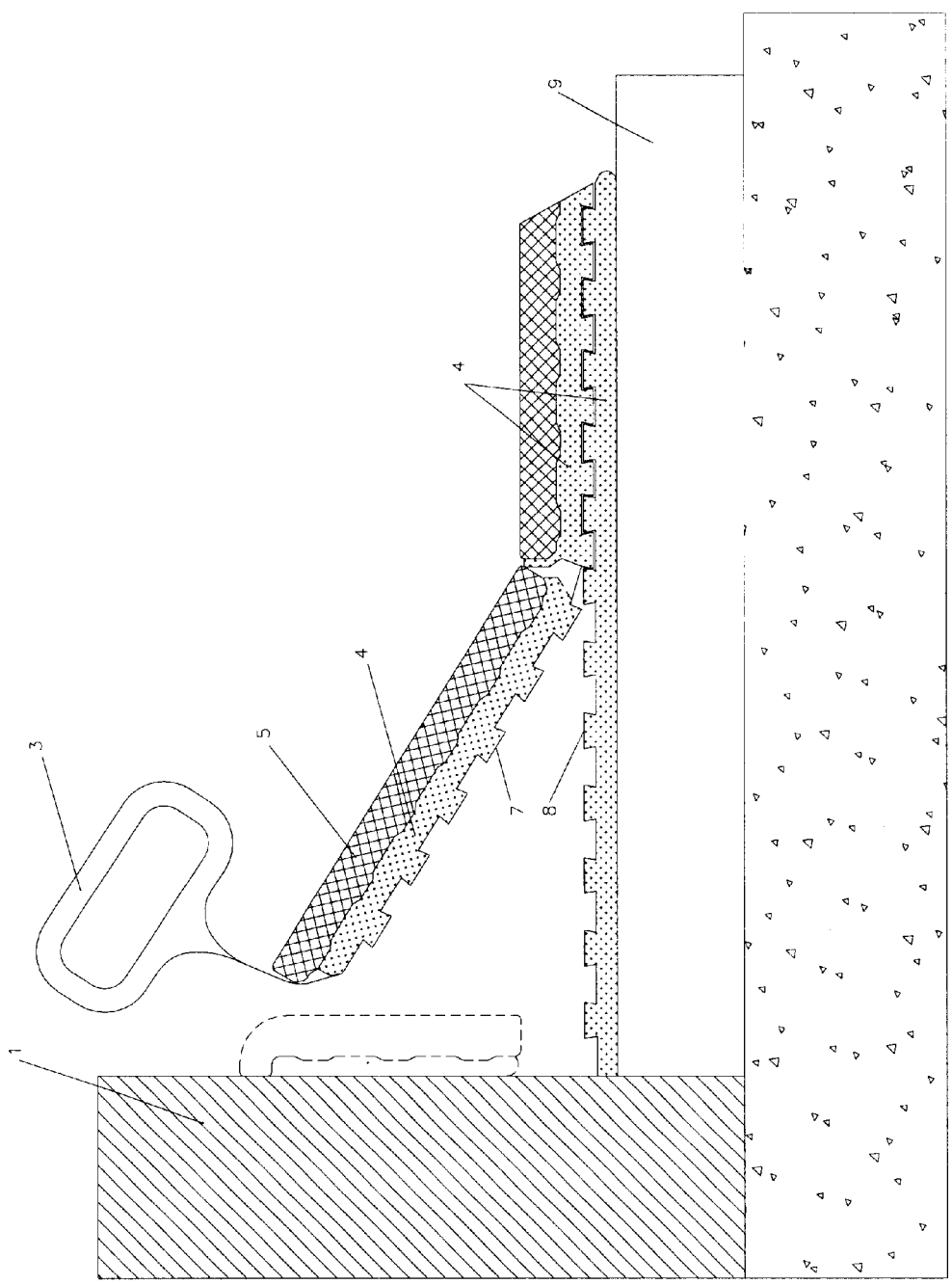
FIG. 2 shows the invention as applied to a floor to be replaced.
Figure 3:
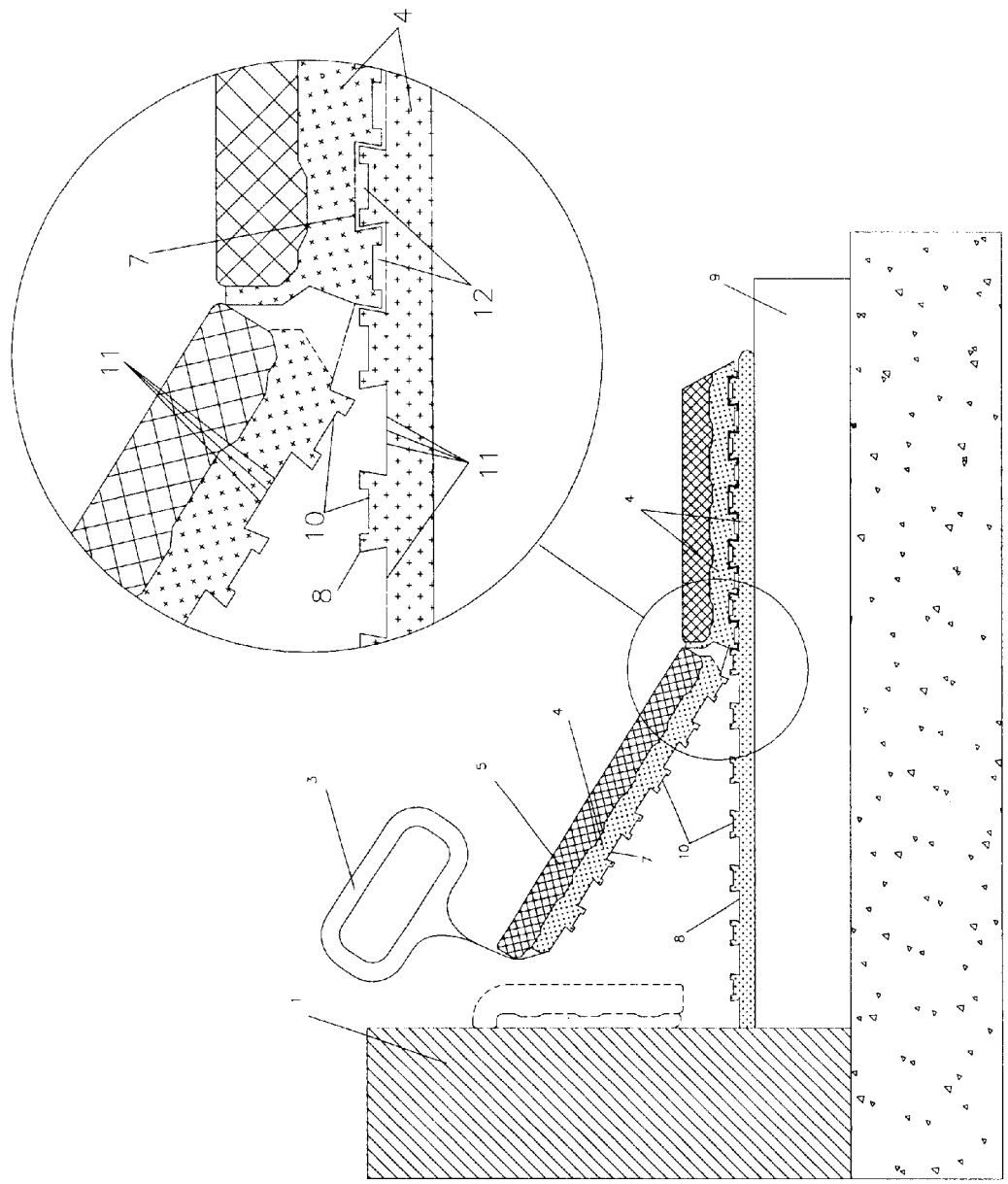
Figure 4:
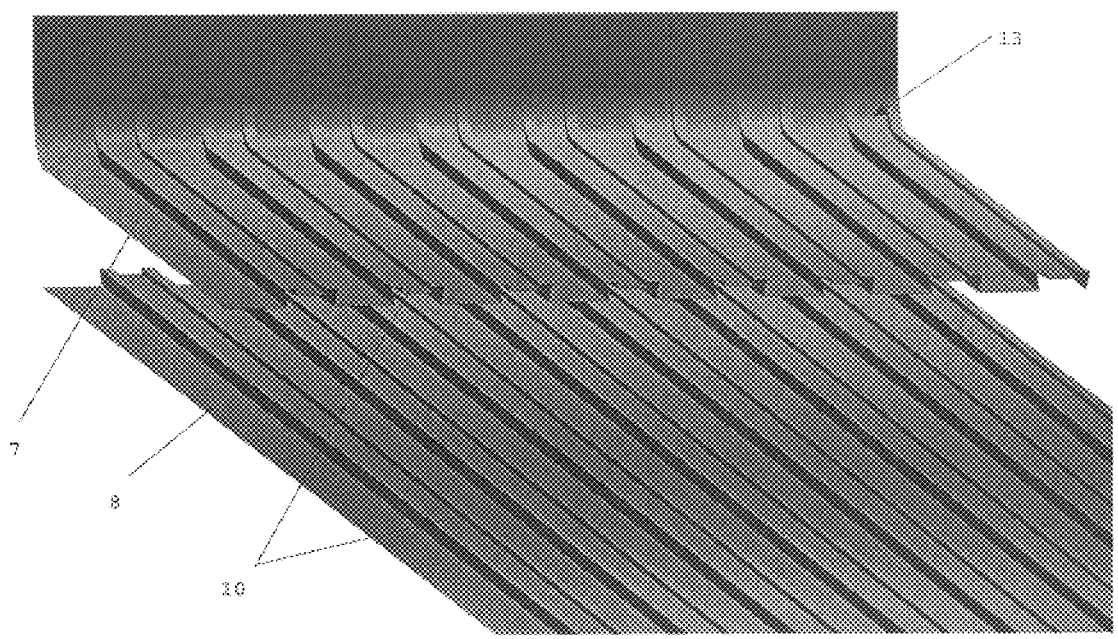

FIG. 3, which is similar to FIG. 2, shows a second embodiment of the invention;

FIG. 4 shows a view of a third embodiment of the invention.

Referring now the drawings, according to the present invention a fret shaped sheath is used, which consists of a flexible plastic and is placed in double layer on a support sheeting 9 (which could be also a floor or a lining), so as to mutually engage to one another the fixed element 8 and the movable element 7, having the same shape, so as to attain a removable engagement there between.

Preferably, said fret shaped sheath 7, 8 has a cross-section such that the substantially parallel walls of the groovings are slightly tilted, so that any projecting portion has a dovetail shaped outline, which is particularly adapted to be engaged within the corresponding grooving having a like outline or profile.

It should be emphasized that the use of a sole kind of support for carrying out the fixed portion 8 and the movable portion 7 has obvious economical advantages assuring at the same time the necessary functionalities such as a quick removal of the floor or lining and a subsequent replacement thereof.

From the practical point of view, the movable element 7 preferably has projecting portions of its fret shape, which are sized to allow an exact insertion into the corresponding groovings of the fret shaped fixed element 8.

Conveniently, the support or fixed lower sheath 8 may be incorporated in the sheeting 9 during the formation thereof, or it may be, subsequently, secured thereto by glueing it by a conventional glue for floors or linings.

A further advantage of the invention is that it is possible to attain said function also for floors or linings 5 consisting of thin materials, such as linoleum, moquette, wall-paper. In fact, it is also foreseen the use of sheaths or supports of the above said kind, but having less deeper groovings of the fret shaped profile, which are less deep for attaining thus a more uniform surface capable to provide a more omogeneous and continuous support.

A first modification of the present invention relates to the cross-section shape of the fret shaped support of sheath as here above disclosed. With particular reference to the FIG. 3 it should be noted that according to the invention said modification provides that the projecting portion of the zig-zag shape has a longitudinal groove 10, which is parallel to the sheath groovings.

Conveniently, when the two fixed and movable supports or sheaths 8 and 7 are coupled with one another, said further groove 10 forms a duet 12 capable of assuring the perspiration of both the lower support sheeting 9 and glue 4. According to the invention, for this end, on the bottom of the groovings of the fixed and movable portions 8 and 7 there are provided small perspiration holes 11, which communicate with the longitudinal duets 12 terminating at the wall which delimit the floor itself.

It should be noted with this regard, that this first modification may cause an easier damaging of a so formed support, which has a lesser tearing resistance.

A second modification shown in FIG. 4 relates to the folding of the movable fret shaped sheath 7 along the edges delimiting the floor. With this regard, it should be noted that the sheath, till now disclosed, allows an easy folding along the parallel sides of the Greek key shape, but at the other two sides said folding is hindered by the fret shape itself, which forms strengthening ribs which hinder the deformations in the direction perpendicular to the plane of the sheath itself.

For this end, in this second modification it is provided at least one deformable bellow-shaped zone 13 preferably arranged near the edge to be folded, which extends transversally to the groovings of the fret shaped sheath and is adapted to allow an easy upward and downward folding of the end portion of the sheath.

Conveniently, this modification is particularly useful f.i. for the floorings of terraces, for which it advisable to provide a kind of "water tight basin" solidly connected with the perimetral walls of the terrace. Moreover, according to a peculiar feature of the invention, the provision of the above said perspiration duets 12 allows the evaporation of possible condensates between the flooring 5 and the sheeting 9.

Such modification is useful also for balconies and projecting coverings, for which it is advisable to downwardly fold the ends of the sheath for hindering a penetration of moisture into the sheeting and below the flooring.

A still further modification of the invention provides the use of a movable support or sheath 7 consisting of a particularly resistant non-woven fabric, of the commercially available kind, preferable preformed so as to have a contacting surface, exactly corresponding to that of the fixed sheath 8.

Finally, according with the present invention there are provided perimetral side cavettos consisting of a corrosion and moisture resistant material and provided of handles 3 or hooking elements, which are hidden, f.i. by a skirting board, on the wall 1 and facilitate the separation of the movable sheath 7 from the fixed sheath 8 for removing the floor or the lining.

The method according to the present invention comprises the following steps:

A. Fixing the sheath 8 to the support sheeting during the realization of the same or thereafter by means of a glueing material, well known in the art;

B. Positioning the movable sheath 7, provided with perimetral cables for its removal, and fitting it into the fixed sheath 8;

C. Glueing the floor or lining 5 onto the movable sheath 7;

D. Hiding of the final element or handles 3 of the cavettos beneath the skirting board or like.

Should the floor or lining 5 be removed, the new floor or lining 5 can be easily placed by carrying out the above process step B, wherein the above said movable sheath 7 consists of a flexible material, likely as the fixed sheath 8 or it is made of a non-woven fabric, preferably a preformed one.

From the operative point of view, it is important to note that for a first laying down operation, the fixed and movable sheath are supplied already fitted with one another, the process step B will be, advantageously, avoided and will be necessary only for a future laying down of a new floor or lining 5 after the removal of the previous one.

Advantageously, according to the invention it is also possible to use a fixed sheath 8 of the kind shown in FIG. 2, with a movable sheath 7 according to the first modification shown in FIG. 3: in this way there may be formed the transpiration duets 12 and maintained a fixed support 8 having a profile particularly resistant to tearing operations of the lining and a new laying down.

The present invention has been disclosed and shown in its preferable embodiment and in some modifications thereof, but it should be pointed out that a person skilled in this art will be able to carry out some functionally equivalent modifications and/or changes, without coming out from the scope of the claims.

What is claimed is:

1. A method for laying down floors or linings and for their quick removal and replacement by gluing or fixing the floors or linings onto a support, the support being removable with respect to a support sheeting (9) comprising:
    immovably affixing a fixed support (8) to the support sheeting,
    providing a movable support (7), wherein the fixed support (8) and the moveable support (7) have a substantially similar shape, and
    movably fitting the movable support (7) to the fixed support (8), wherein floors or linings (5) are laid down atop the movable support (7);
    wherein the shape of said fixed support (8) and movable support (7) consist each of a fret shaped sheath, having projecting portions and hollow portions, of a flexible and resistant material and have a dovetail shaped cross section of substantially the same shape and, wherein at least one of said fixed support (8) and said movable support (7), have the projecting portion of Greek fret shape provided with a longitudinal groove (10) extending parallel to the fret shape itself, so that when the two sheaths (8 and 7) are coupled with one another, said further groove (10) forms a duet (12) which allows the transpiration of both the underlaying support sheeting (9) and adhesive material (4), wherein on the bottom of the grooves of the fret shaped fixed (8) and movable (7) sheaths small transpiration holes (11) are provided, which communicate with said longitudinal duets (12) terminating at the wall which delimits the floor or lining itself.

2. A method according to claim 1, wherein the projecting portions of the fret shaped movable sheath (7) are sized to allow their fitting into the corresponding hollow portions of the fret shaped fixed sheath (8), each of said projecting and hollow portions having the dovetail shaped cross section to form at least one dovetail joint.

3. A method according to claim 2, comprising arranging said fret shaped flexible moveable sheath in double layers on the support sheeting (9) so that the fixed sheath (8) and the movable sheath are removably fitted.

4. A method according to claim 1, wherein the fixed sheath (8) either is embedded within the support sheeting (9) during manufacture thereof or is anchored thereto subsequently by gluing it on the sheeting by means of a glue (4).

5. A method according to claim 1, wherein for floors or linings (5) consisting of thin materials, selected from the group consisting of linoleum, moquettes or wall-papers, the fixed (8) and movable (7) sheaths each comprise a fret shape having projecting portions and hollow portions which are less projecting and less deep, so as to attain a more uniform surface adapted to attain a more homogeneous and continuous support.

6. A method according to claim 1, wherein said movable sheath (7) consists of a non woven fabric, which is particularly resistant.

7. A method according to claim 6, wherein said movable sheath (7) of a non-woven fabric has a contact surface exactly fitting with the surface of the fixed sheath (8).

8. A method according to claim 1, wherein the fret shaped movable sheath (7) has at least one zone capable to be deformed into a bellow shape and provided near the edge to be folded, perpendicularly to the grooves of said fret shaped sheaths, which zone allows to downwardly and upwardly fold the end portion of the movable sheath (7).

9. A method according to claim 1, wherein said fitting comprises removably engaging the projections and hollow portions of the fixed support to the projector and hollow portions of the movable support.

10. Anchoring means for a laying operation of floors and linings and for quick removal and replacement of the floors and linings by gluing or fixing the floors or linings onto a support, the support being removable with respect to a support sheeting (9) comprising:

immovably affixing a fixed support (8) to the support sheeting, providing a movable support (7), wherein the fixed support (8) and the moveable support (7) have a substantially similar shape, movably fitting the movable support (7) to the fixed support (8), and the movable support, wherein floors or linings (5) are laid down atop the movable support (7);

wherein the shape of said fixed support (8) and movable support (7) consist each of a fret shaped sheath, having projecting portions and hollow portions, of a flexible and resistant material and have a dovetail shaped cross section of substantially the same shape, said anchoring means comprising:

said fixed support (8) and movable support (7) having substantially the same shape, the fixed support (8) being irremovably secured to the support sheeting (9) and the movable support (7) being removably fitted to the fixed support (8) and supports a floor or lining (5) fixed by an adhesive on the same, wherein said fixed (8) and movable (7) supports are formed by fret shaped sheaths having the same shape and consisting of a flexible and resistant material, wherein said movable sheath (7) has projecting portions of the Greek fret shape which have sizes allowing their insertion into corresponding hollow portions of the Greek fret shape of the fixed sheath (8), said projecting and hollow portions having said dovetail shaped cross-section, and wherein a said projecting portion of said fixed support sheath (8) and movable support sheath (7) respectively has the Greek fret shape provided with a longitudinal groove (10), extending parallel to the fret shape itself, so that when both fixed support sheath (8) and movable support sheath (7) are coupled with one another, said longitudinal groove (10) forms a duet (12) adapted to allow the transpiration of the underlaying support sheeting (9) and of the adhesive material (4), wherein on the bottom of the grooves of the fixed (8) and movable (7) fret shaped support sheaths, small transpiration holes (11) are provided for which are in communication with the longitudinal duets (12) terminating at the wall which delimits the covering or lining.

11. Anchoring means according to claim 9, wherein the movable fret shaped sheath (7) has at least one zone, capable to be deformed, having a bellow shape (13) and extending orthogonally to the grooves of the fret shape near the edge to be folded, which zone is adapted to be easily upwardly and downwardly folded at the end portion of the movable sheath (7) itself.

* * * * *

UNITED STATES PATENT AND TRADEMARK OFFICE
CERTIFICATE OF CORRECTION

PATENT NO.   : 6,631,598 B2　　　　　　　　　　　　　　　　　　　　　　　Page 1 of 1
DATED        : October 14, 2003
INVENTOR(S)  : Gabriele Raineri It is certified that error appears in the above-identified patent and that said Letters Patent is hereby corrected as shown below:

<u>Title page,</u>
Insert the following:
-- [30] Foreign Application Priority Data
March 17, 2000　　　　(UD)　　　　RM2000A000144 --

Signed and Sealed this

Thirtieth Day of March, 2004

JON W. DUDAS
*Acting Director of the United States Patent and Trademark Office*